A. RALSTON.
Flood Gate.
No. 48,977.
Patented July 25, 1865.
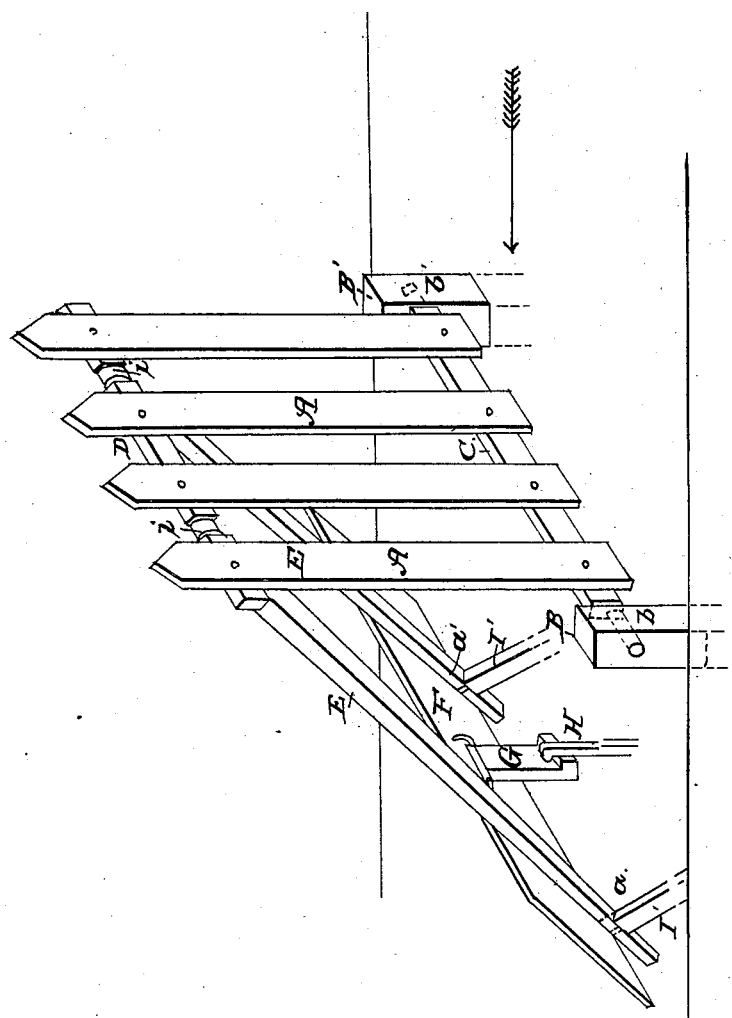

UNITED STATES PATENT OFFICE.

ANDREW RALSTON, OF CARLISLE, PENNSYLVANIA.

IMPROVED FLOOD-GATE.

Specification forming part of Letters Patent No. 48,977, dated July 25, 1865.

*To all whom it may concern:*

Be it known that I, ANDREW RALSTON, of Carlisle, in the county of Cumberland and State of Pennsylvania, have invented a new and useful Improvement on a Flood-Gate; and I do hereby declare that the following is a full, clear, and exact description of the construction and operation of the same, reference being had to the annexed drawing, making a part of this specification.

The drawing represents a perspective view of the same.

The nature of my invention consists in constructing a fence or gate that will yield to a current of water, and fall prostrate to let the water pass over it in case of a flood, preventing material damage to the gate, and after the subsidence of the water it can be replaced with but little trouble and expense.

To enable others skilled in the art to make and use my invention, I will proceed to describe its construction and operation.

I construct my gate in the manner of a pale fence, having the upright pieces A A, &c., nailed to the cross-bars D and C. The ends of the lower cross-piece are rounded, and move in the sockets in the short posts B B', which are secured in the bed of the stream. The gudgeons and sockets are shown with dotted lines at $b$ and $b'$.

To the upper cross-piece D are connected two arms, E E', with movable joints $i$ $i'$, and provided with a float, F, at the lower part thereof. These arms support the gate erect, and are provided with an aperture, right and left, which rest on pins, as shown by the dotted lines at $a$ I and $a'$ I'. The pins are fastened in the posts I I', which are secured in the stream in a proper manner.

G is a movable wooden block in the form of a hook, hinged at the top, and clasping the hook H below, which keeps the gate locked in low water.

During a flood, when the water rises in the stream, the wooden block G unlocks from the hook H, and the water lifts the float F out of the pins $a$ $a'$, and carries with it the gate from a perpendicular to a horizontal position, which gives vent to the swollen stream, and saves the gate from destruction.

The course of the arrows indicate the current of the stream.

I am aware that a number of flood-gates have been constructed and used which are operated by the rise of water. All such I do not claim as my invention.

I claim as my invention, and desire to secure by Letters Patent—

1. The combination of the float F, arms E E', and upright gate A A, in the manner and for the purpose within described.

2. The movable block G, when combined with the float F and hook H, in a flood-gate, constructed in the manner and for the purpose herein described.

ANDREW RALSTON.

Witnesses:
 DAVID RALSTON,
 C. L. LOCHMAN.